United States Patent
Qama et al.

(10) Patent No.: US 12,460,952 B2
(45) Date of Patent: Nov. 4, 2025

(54) METHOD FOR CALIBRATION LINEARIZATION FUNCTION FOR CORRECTING OUTPUT OF POSITION SENSOR

(71) Applicant: Renesas Electronics America Inc., Milpitas, CA (US)

(72) Inventors: Gentjan Qama, Aschheim (DE); Josef Janisch, Ilz (AT)

(73) Assignee: Renesas Electronics America Inc., Milpitas, CA (US)

( * ) Notice: Subject to any disclaimer, the term of this patent is extended or adjusted under 35 U.S.C. 154(b) by 458 days.

(21) Appl. No.: 18/166,583

(22) Filed: Feb. 9, 2023

(65) Prior Publication Data

US 2023/0251115 A1 Aug. 10, 2023

(30) Foreign Application Priority Data

Feb. 9, 2022 (EP) .................................... 22155840

(51) Int. Cl.
*G01D 18/00* (2006.01)
(52) U.S. Cl.
CPC .................................. *G01D 18/001* (2021.05)
(58) Field of Classification Search
CPC ................................................... G01D 18/001
See application file for complete search history.

(56) References Cited

U.S. PATENT DOCUMENTS

| | | | |
|---|---|---|---|
| 4,853,604 A | 8/1989 | McMullin et al. | |
| 11,099,036 B2 * | 8/2021 | Qama | G01D 5/2053 |
| 11,159,169 B2 * | 10/2021 | Ali | H03M 1/0641 |
| 11,609,082 B2 * | 3/2023 | Qama | G01D 18/008 |
| 11,650,086 B2 * | 5/2023 | Loeken | G01D 18/001 |
| | | | 33/1 N |
| 2020/0072643 A1 * | 3/2020 | Qama | G01D 5/2053 |
| 2020/0292360 A1 * | 9/2020 | Kettering | G01D 5/145 |
| 2021/0364652 A1 * | 11/2021 | Spasovski | G01S 19/23 |
| 2023/0251116 A1 * | 8/2023 | Qama | G01D 18/004 |
| | | | 73/1.79 |

FOREIGN PATENT DOCUMENTS

EP 3627113 A1 3/2020

* cited by examiner

*Primary Examiner* — Stephanie E Bloss
*Assistant Examiner* — Diana Hancock
(74) *Attorney, Agent, or Firm* — SCULLY, SCOTT, MURPHY & PRESSER, P.C.

(57) ABSTRACT

A method for calibrating a linearization function for correcting the output of a position sensor providing a continuous output position signal, wherein the method optimizes the linearization function by defining optimal positions of the linearization points of the linearization function.

15 Claims, 4 Drawing Sheets

METHOD FOR CALIBRATION LINEARIZATION FUNCTION FOR CORRECTING OUTPUT OF POSITION SENSOR

CROSS-REFERENCE TO RELATED APPLICATION

The present application claims priority under 35 U.S.C. § 119 to European Patent Application No. 22155840.6, filed on Feb. 9, 2022. The entire disclosure of European Patent Application No. 22155840.6 is incorporated by this reference.

BACKGROUND

The present application relates to a method for calibrating a linearization function for correcting the output of a position sensor providing a continuous output position signal. The present application further relates to a position sensor implementing the method.

Many applications need position feedback of a moving target like a rotating member, for example in motor control systems. In most cases, an additional position sensor is mounted at one end of a rotating shaft of the motor to generate the required position information. Conventionally, magnetic position sensors and inductive position sensors are known. Since current carrying parts like motor cables or battery cables, a rotating motor package, the stator of the motor or additional equipment like a motor brake cause magnetic fields that may disturb magnetic fields, the use of inductive position sensors is preferred to provide robustness against such magnetic fields.

There are disclosed techniques listed below.
[Patent Document 1] U.S. Pat. No. 4,853,604
[Patent Document 2] European Patent 3 627 113

Inductive position sensors implement a magnet-free technology, utilizing the physical principles of eddy currents or inductive coupling to detect the position of a target that is moving above a set of coils, consisting for example of one transmitter coil and two receiver coils, such as a sine receiver coil and a cosine receiver coil. Such an inductive sensor system is for example disclosed in Patent Document 1.

However, these systems exhibit inaccuracies for many reasons. For example, the electromagnetic field generated by the transmitter, and the resulting fields generated in the metallic target, may be non-uniform, the connections of wire traces to the transmitter coil and the arrangement of receiver coils, such as the sine receiver coil and the cosine receiver coil, may result in further non-uniformity. The air gap between the metallic target and the coils mounted on the Printed Circuit Board (PCB) may be non-uniform. Further, the amplitudes of signals generated by the receiver coils may have an offset. There may be mismatches between the multiple receiver coils. There may be different coupling effects between the metallic target and each of the multiple receiver coils. These and other factors may result in inaccurate results of the position locating system.

To improve the accuracy of known position sensors, Patent Document 2 discloses a method of calibrating and linearization. According to this method, spatial angle data is read from the position sensor at a set of positions of a target swept over receive coils in the position sensor. From the spatial angle data, calibration parameters are calculated by matching an electrical measured position with a mechanical reference position. Afterwards initial position values are determined from the spatial angle data and the calibration parameters. The initial position values are used to determine linearization parameters by linearization of the measured position. The calibration parameters and linearization parameters are written into the position sensor.

SUMMARY

In some examples, a method for calibrating a linearization function for correcting the output of a position sensor providing a continuous output position signal, wherein the linearization function has a predetermined number of linearization points, and wherein each linearization point specifies a correction factor for a corresponding position of the output signal of the position sensor, is generally described. The method comprising the steps of:
  initializing the linearization function by setting initial positions for all available linearization points, wherein the correction factor of each initial linearization point is zero;
  determining the output of the position sensor for a full period by applying the linearization function to the position signal of the position sensor for the full period;
  setting the correction factors for each initial linearization point by comparing the output of the position sensor with a reference signal, wherein the reference signal provides an ideal position signal for the full period of the position sensor;
  re-determining the output of the position sensor for a full period by applying the linearization function to the position signal of the position sensor for the full period;
  calculating an error vector for the full period of the position sensor by comparing the output of the position sensor with the reference signal;
  detecting the maximum error of the error vector;
  if the maximum error is above a predefined threshold optimizing the linearization function by:
    extracting the position of the maximum error from the error vector;
    finding the linearization point that is closest to the maximum error of the error vector;
    modifying the linearization point that is closest to the maximum error by stepwise changing the position of the linearization point within predefined boundaries and changing the corresponding correction value based on the comparison of the output of the position sensor with the reference signal;
    re-calculating the error vector for each step of the modified linearization point to find a position of a minimum error for that linearization point; and
    setting the linearization point to the position of the minimum error; and
  if the maximum error is below the predefined threshold:
    storing the linearization function in the position sensor.

Generally, the linearization function specifies correction factors for certain positions of the output of the position sensor. The correction factor corresponds to the difference of the position information of the position sensor and the position information of the reference signal at a certain position. For positions of the output of the position sensor between two linearization points the corresponding correction factor is obtained from interpolation between the adjacent linearization points. By applying the linearization function to the position signal of the position sensor, the correction factor is added to/subtracted from the position signal of the position sensor to correct the output of the position sensor. Between two linearization points, an interpolation is used to estimate the correction factor.

At the beginning of the method for calibrating the linearization function, the initial positions for all available linearization points, i.e., the predetermined number of linearization points, are defined. The correction factors for these initial positions of the linearization functions are zero at this stage of the method because the difference of the output of the position sensor to an ideal position signal is unknown.

Next, the output of the position sensor is determined for a full period by applying the linearization function to the position signal of the position sensor for the full period. During the first run, the error of the output of the position sensor is not corrected, since the correction factors of all linearization points is zero. This step could also be referred to as determining the uncorrected output of the position sensor without applying the linearization function. However, in a practical implementation, the same algorithm is used as during the correction of the position signal of the position sensor using a linearization function with correction factors being zero.

Next, the correction factors of all initial linearization points are defined by comparing the output of the position sensor with a reference signal. The reference signal provides an ideal position signal for the full period of the position sensor, e.g., using ideal input signals or a high-precision position sensor, for example from a laboratory set-up. By comparing the output of the position signal with the reference signal at the positions of the initial linearization points, the corresponding correction factors for all linearization points can be defined. The correction factors correspond to the difference between the output of the position sensor and the reference signal at the position of the respective linearization point.

In the next step of the method, the output of the position sensor is re-determined for a full period by applying the linearization function to the position signal of the position sensor for the full period. Thus, this time the output of the position sensor is corrected using the correction factors of the linearization function for the respective positions of the linearization points. For positions of the output of the position sensor between two linearization points, the corresponding correction factor is obtained from interpolation between the adjacent linearization points.

From the re-determined output of the position sensor, an error vector for the full period of the position sensor can be calculated by comparing the output of the position sensor with the reference signal. The error vector can also be referred to as error curve. The reference position can be determined using a certain sampling frequency, wherein the sampling frequency is much higher than the number of linearization points of the linearization function.

The error vector is used to detect the maximum error of the output of the position sensor. This maximum error is checked against a predefined threshold, i.e., error level. If the maximum error is below the predefined threshold, the linearization function can be used to reduce the error of the output of the position sensor and is therefore stored in the position sensor.

If the maximum error is above the predefined threshold, the linearization function is further optimized by amending the linearization point closest to the maximum error.

First, the position of the maximum error is extracted from the error vector. Afterwards, the linearization point closest to the maximum error of the error vector is identified.

The identified linearization point closest to the maximum error is modified by stepwise changing the position of the linearization point within predefined boundaries. At the same time, the corresponding correction value of the linearization point is changed based on the comparison of the output of the position sensor with the reference signal.

For each step of the stepwise changing of the linearization point the error vector of the output of the position sensor is re-calculated. Thereby, a minimum error for that linearization point can be found.

The optimization of the linearization function is terminated by setting the identified linearization point closest to the maximum error to the position of the found minimum error for that linearization point.

Each linearization point corresponds to a position of the position sensor and a correction factor at this position determined based on the difference of the output of the position sensor at this position and the ideal position defined by the reference signal at that position.

At the end of the method, the linearization function is stored in the position sensor, for example in a register of a signal processing unit of the position sensor. During use of the position sensor afterwards, the linearization function is used to correct the output of the position sensor and to fulfil certain requirements like Automotive Safety Integrity Levels (ASIL), e.g. required by autonomous driving systems.

The linearization function comprises for example at least 16 linearization points. To improve the accuracy of the position sensor the number of linearization points can be increased. However, the processing power and storage of position sensors is limited, which restricts the number of linearization points of the linearization function.

In a variant, the method comprises the step of applying a zero calibration to the position sensor signal setting a mechanical initial position of the position sensor to a position value of zero. Thus, the start position of the position sensor is zero, like e.g., 0° for a rotational sensor.

According to a variant, the method further comprises the step of applying a zero calibration to the reference signal setting a mechanical initial position of the reference signal to a position value of zero. Thus, the start position of the position sensor signal and the start position of the reference signal are synchronized each period, as both start at zero.

Pursuant to a variant, the reference signal is provided by an external high precision position sensor system. Alternatively, the reference signal is generated by using an ideal input signal for calculating the position and the corresponding ideal output of the position sensor.

According to a variant, the steps of re-determining the output of the position sensor, calculating the error vector, detecting the maximum error, and optimizing the linearization function are repeated until the maximum error is below the predefined threshold and/or until all initial linearization points of the linearization function have been optimized. In this variant, more than one initial linearization point is optimized, to, for example, guarantee a certain error level or to minimize the error as much as possible. The initially defined linearization point can be optimized sequentially until the maximum error is below the predefined threshold and/or until all initially defined linearization points have been optimized.

In a variant, the step of optimizing of the linearization function is only performed once for each initial linearization point. Thus, if an initial linearization point has been optimized, i.e., the position and the correction values have been re-defined, it is afterwards not again optimized.

According to a variant, the method comprises during each repetition the step of revising the correction factors corresponding to the difference between the output of the position sensor and the ideal position of the reference signal for all linearization points after the position of an initial linearization point has been amended. Once an initial linearization point has been optimized, i.e., the position and correction factor thereof have been reset to minimize the error, the correction factors of all other linearization points are revised because the optimization of one linearization point might affect the correction factors of the other linearization points, such as the adjacent linearization points.

Pursuant to a variant, the setting of the initial positions for all available linearization points depends on the form of the expected output signal of the position sensor. According to a variant, the distance between two adjacent initial linearization points is constant for a linearly changing output signal. Alternatively, the number of initial linearization points is higher in areas of the output signal with a non-linearly rate of changing and lower in areas of the output signal with a constant output signal or a linearly changing output signal. The output of the position sensor can be for example a linear output with a positive or negative slope. In that case the initial linearization points can be equally spaced along the position of the position sensor. In case of linear output with clamps (constant areas at the beginning and/or end) and a positive or negative slope, the initial linearization points may be positioned less frequently in the clamps area and more frequently in the slope area. Other possible output signals of the position sensor are for example double ramp output, trapezoid output, linear output with one or more breaks, and so on.

In a variant, the step size of the stepwise changing of the position of the linearization point within predefined boundaries depends on the position sensor, for example on the resolution of the position sensor, the accuracy of the position sensor, the processing and/or storage capabilities of the position sensor or similar attributes of the position sensor. The higher the resolution and/or accuracy of the position sensor, the smaller should be the step size, to guarantee the resolution and/or accuracy. The step size further depends on the processing and/or storage capabilities of the position sensor because a smaller step size involves more computations and hence storage space. According to a variant, the boundaries of the stepwise changing of the position of the linearization point within predefined boundaries depend on the distance to the neighbouring linearization points. The boundaries should not exceed the distance to the neighbouring linearization point, to prevent a change of order of linearization points. Such a re-ordering can be avoided if the boundaries around the position of the initial linearization point are smaller than the distance to the neighbouring linearization points, for example, half or less than the distance to the neighbouring linearization points. Even if two neighbouring linearization points are optimized within the maximum possible boundaries, a re-ordering is avoided because the boundaries correspond to half the distance between two neighbouring linearization points. Thus, the original order of the linearization points is not changed by the method. This simplifies the linearization function, as the processing unit of the position sensor can easily calculate the slope between each two linearization points of the linearization function, which is required to apply the linearization function to the continuous output signal of the position sensor.

In some examples, a position sensor is generally described. The position comprises a signal processing unit implementing the method. The position sensor comprises a non-volatile storage for storing the linearization function determined by the method. The stored linearization function can afterwards be applied to the output of the position sensor.

BRIEF DESCRIPTION OF THE DRAWINGS

Embodiments will be further explained with respect to the figures.

DETAILED DESCRIPTION

In an example, a method 1 for calibrating a linearization function 2 for correcting the output of a position sensor providing a continuous output position signal is generally described. The method 1 optimizes the linearization function 2 by defining optimal positions of the linearization points of the linearization function 2.

Figure 1:
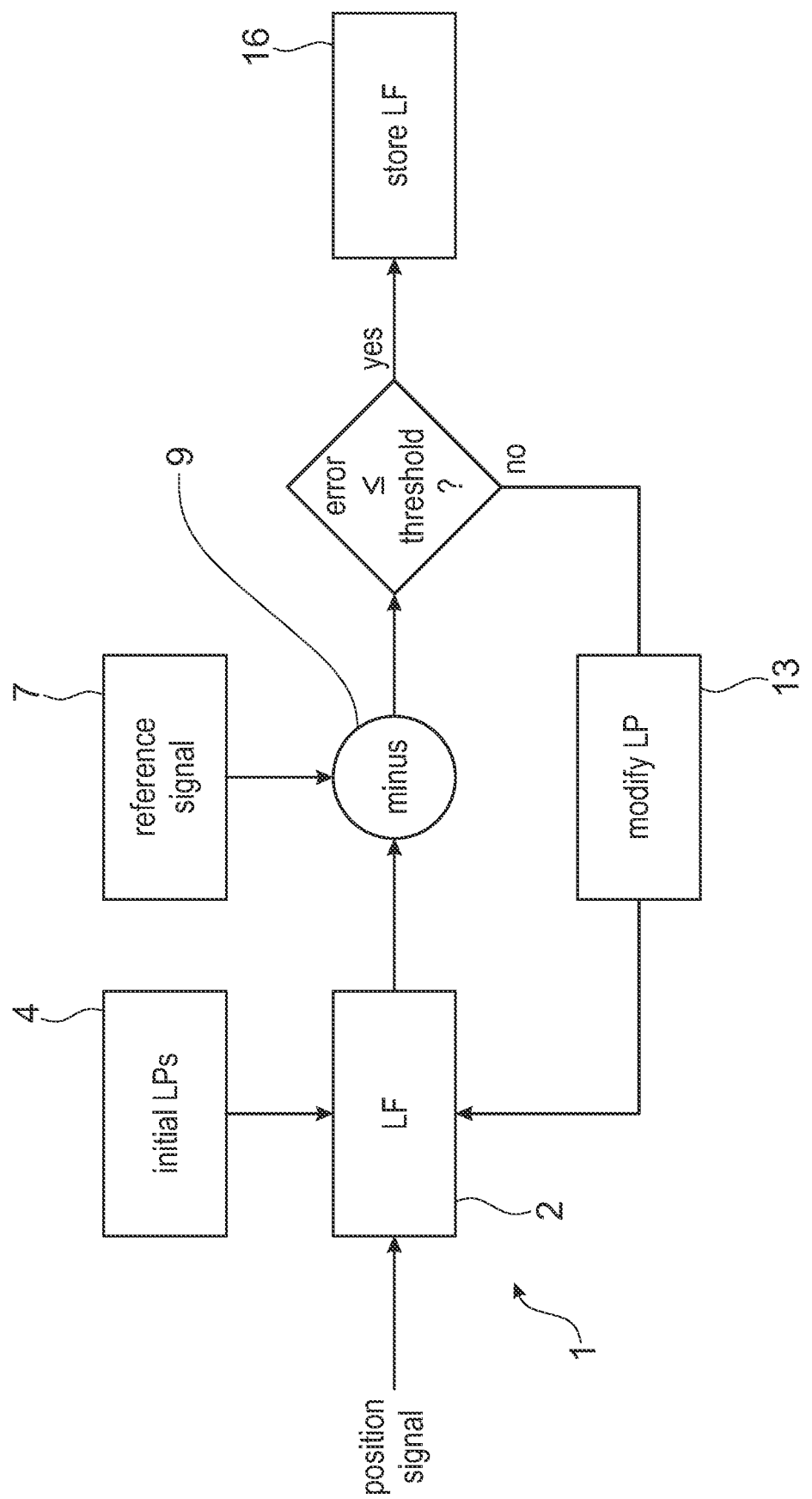
FIG. 1 is a flow diagram showing a generic overview of a method.

FIG. 1 shows a flow diagram showing a generic overview of the method 1. The method 1 is intended for calibration of a linearization function 2 for correcting the output of a position sensor. The position sensor provides a continuous output signal.

The linearization function 2 has a predetermined number of linearization points, wherein each linearization point specifies a correction factor for a corresponding position of the output signal of the position sensor. Thus, each linearization point comprises two values, one value specifying the position and one value specifying the correction value at this position.

At the beginning of the method 1, the linearization function 2 is initialized 3 by setting initial positions for all available linearization points. The correction factor of each initial linearization point is zero. The setting 3 of the initial positions for all available linearization points depends on the form of the expected output signal of the position sensor. For example, the distance between two adjacent initial linearization points is constant for a linearly changing output signal. Thus, for a linear output with a negative slope or positive slope the initial linearization points are equally spaced from each other. If the output signal is changing non-linearly, the number of initial linearization points is higher in areas of the output signal with a non-linearly rate of changing and lower in areas of the output signal with a constant output signal or a linearly changing output signal.

After initializing the linearization function 2, the output of the position sensor is determined 5 for a full period by applying the linearization function 2 to the position signal of the position sensor for the full period. Next, the correction factor for each initial linearization point can be defined by comparing the output of the position sensor with a reference signal 7. The reference signal 7 provides an ideal position signal for the full period of the position sensor. The reference signal 7 is for example provided by an external high precision position sensor system or the reference signal 7 is generated by using an ideal input signal for calculating the position and the corresponding ideal output of the position sensor.

Once the initial linearization points have been defined by their positions and correction factors, the output of the position sensor is re-determined 8 for a full period by applying the linearization function 2 to the position signal of the position sensor for the full period.

Based on the re-determined 8 output of the position sensor, an error vector for the full period can be calculated 9 by comparing the output of the position sensor with the reference signal 7. Furthermore, the maximum error of the error vector is detected 10.

If the maximum error is below a predefined threshold (error level), the linearization function 2 can be used to correct the position signal of the position sensor and to guarantee a certain error level.

If the maximum error is above the predefined threshold, the linearization function 2 is optimized by sequentially modifying 13 one or more linearization points of the linearization function 2. The optimization of the linearization function 2 will be explained in more detail with respect to the embodiments shown in FIGS. 2 to 4.

Figure 2:
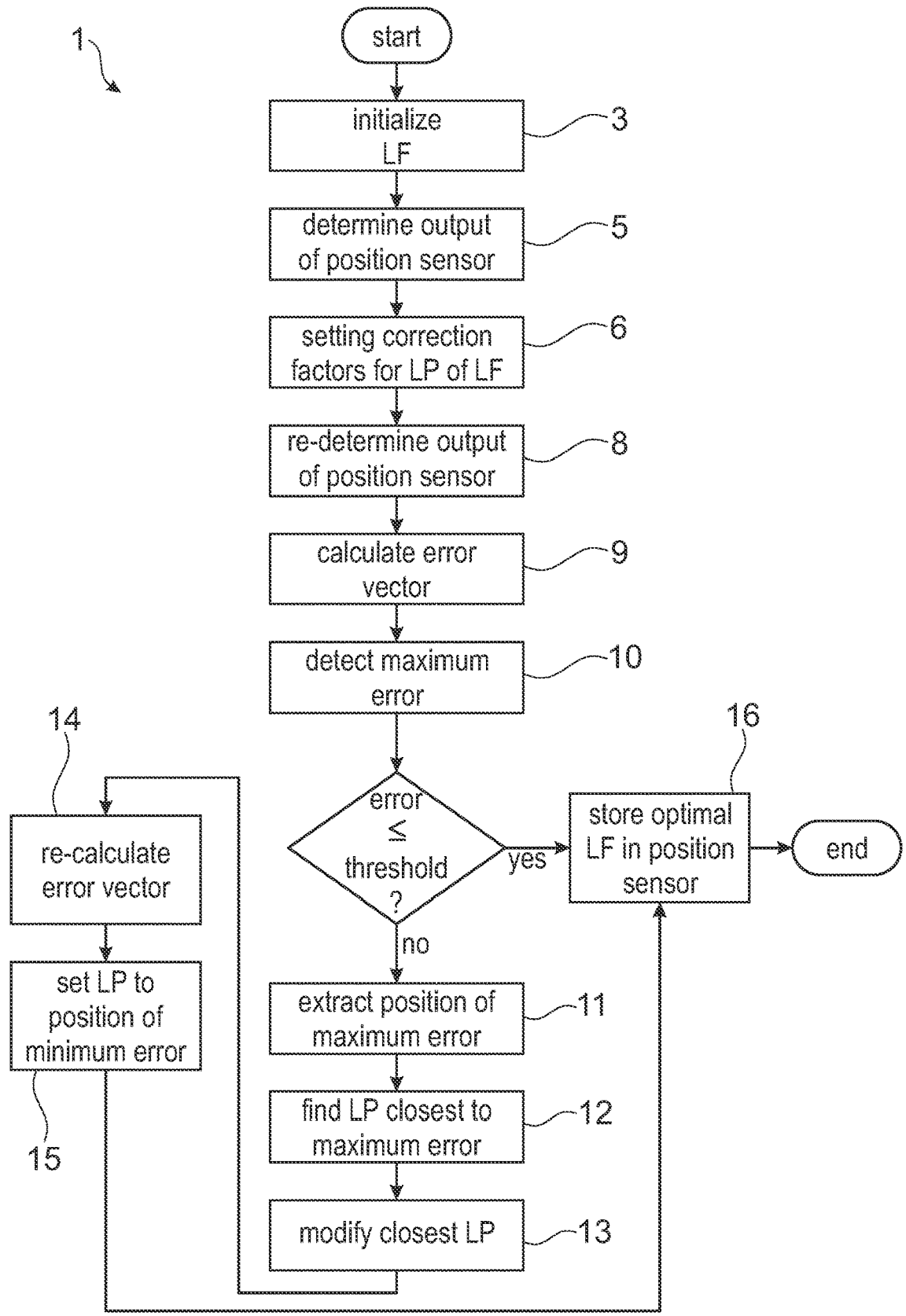
FIG. 2 is a flow diagram showing a detailed first embodiment of the method.

FIG. 2 shows a flow diagram showing a detailed first embodiment of the method 1. The method 1 is used for calibrating a linearization function 2 to correct the output of a position sensor. The position sensor provides a continuous output signal.

After the method 1 has been started, the linearization function 2 is initialized 3 by setting initial positions 4 for all available linearization points. The correction factor of each initial linearization point is zero.

In the following step, the output of the position sensor for a full period is determined 5 by applying the linearization function 2 to the position signal of the position sensor for the full period. Based on this, the correction factor of each initial linearization point can be set 6 by comparing the output of the position sensor with a reference signal 7, wherein the reference signal 7 provides an ideal position signal for the full period of the position sensor. Since the initial correction factor are zero, the linearization function 2 does not change the position signal of the position sensor. This step could also be referred to as determining the uncorrected output of the position sensor.

Next, the output of the position sensor is re-determined 8 for a full period by applying the linearization function 2 to the position signal of the position sensor for the full period. In this step, the positions of linearization points correspond to the positions defined during initializing 3 the linearization points and the correction factors correspond to the set 6 correction factors.

From the re-determined 8 output of the position sensor, an error vector is calculated 9 for the full period of the position sensor by comparing the output of the position sensor with the reference signal 7. Furthermore, the maximum error of the error vector will be detected 10.

If the maximum error is below a predefined threshold (error level), the linearization function 2 can be stored 16 in the position sensor and used for correction the position signal of the position sensor to provide a certain accuracy.

If the maximum error is above the predefined threshold the linearization function 2 is further optimized. Even if the maximum error is below the predefined threshold, the linearization function 2 can be further optimized to further improve the accuracy. In the latter case, the method 1 can buffer different linearization functions 2 and the corresponding maximum errors and decide at the end, which linearization function 2 has the lowest maximum error.

The linearization function 2 is optimized by first extracting 11 the position of the maximum error from the error vector. In the following step, the linearization point closest to the maximum error of the error vector is identified 12.

Afterwards, the linearization point that is closest to the maximum error is modified 13 by stepwise changing the position of the linearization point within predefined boundaries and changing the corresponding correction value based on the comparison of the output of the position sensor with the reference signal 7. For each step of the modified linearization point, the error vector is re-calculated 14, to find a position of a minimum error for that linearization point. The linearization point closest to the maximum error is set 15 to this position of the minimum error.

The step size of the stepwise changing of the position of the linearization point within predefined boundaries depends on the position sensor, such as on the resolution of the position sensor, the accuracy of the position sensor, the processing and/or storage capabilities of the position sensor or similar attributes of the position sensor.

The boundaries of the stepwise changing of the position of the linearization point within predefined boundaries depend on the distance to the neighbouring linearization points. For example, the boundaries around the position of the initial linearization point are smaller than the distance to the neighbouring linearization points, such as half or less than the distance to the neighbouring linearization points.

Figure 3:
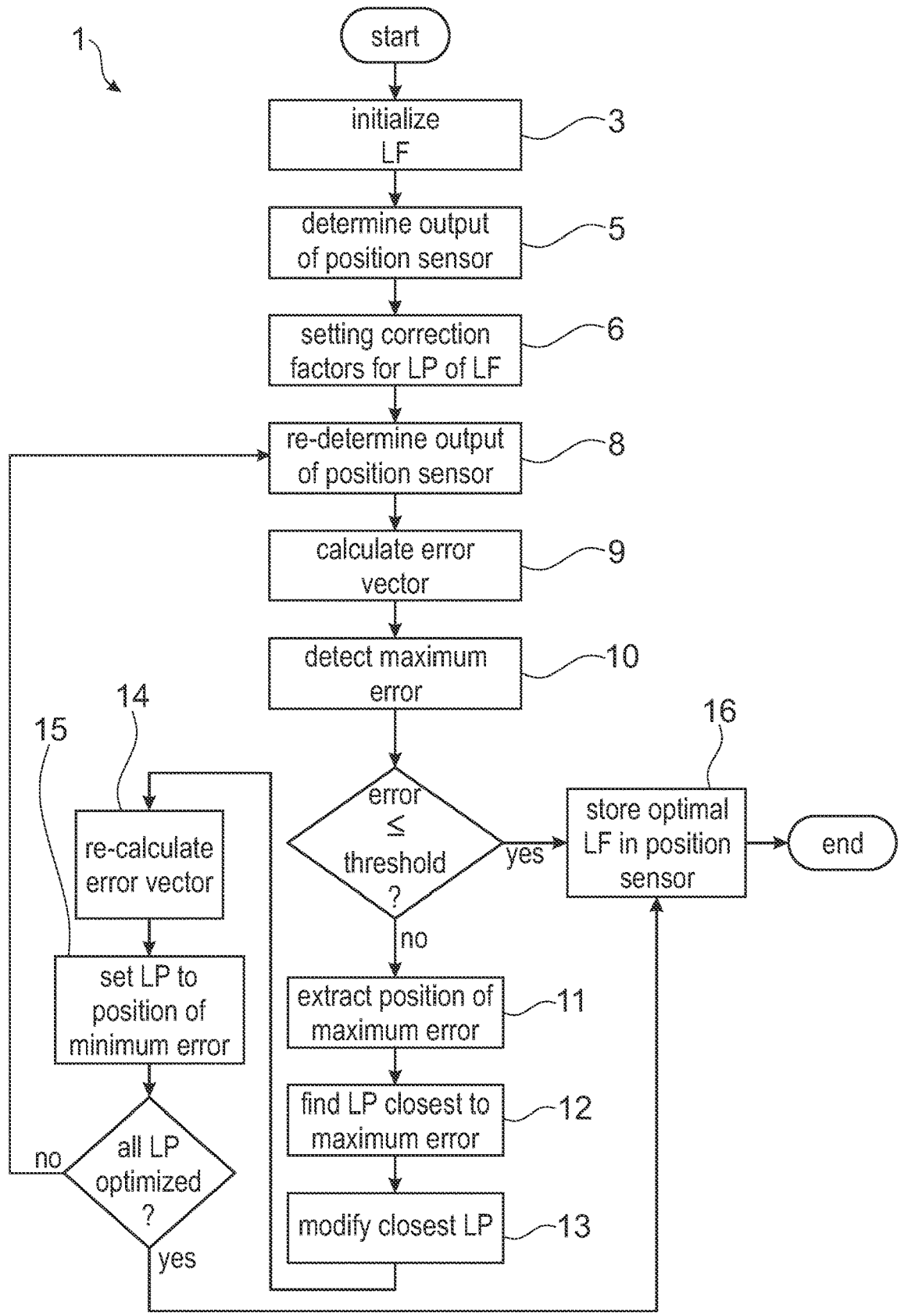
FIG. 3 is a flow diagram showing a detailed second embodiment of the method.

FIG. 3 shows a flow diagram showing a detailed second embodiment of the method 1. The second embodiment shown in FIG. 3 differs from the first embodiment shown in FIG. 2 in that the steps of re-determining 8 the output of the position sensor, calculating 9 the error vector, detecting 10 the maximum error and optimizing the linearization function 2 are repeated until the maximum error is below the predefined threshold and/or until all initial linearization points of the linearization function 2 have been optimized. In an example, each initial linearization point is only optimized once.

Figure 4:
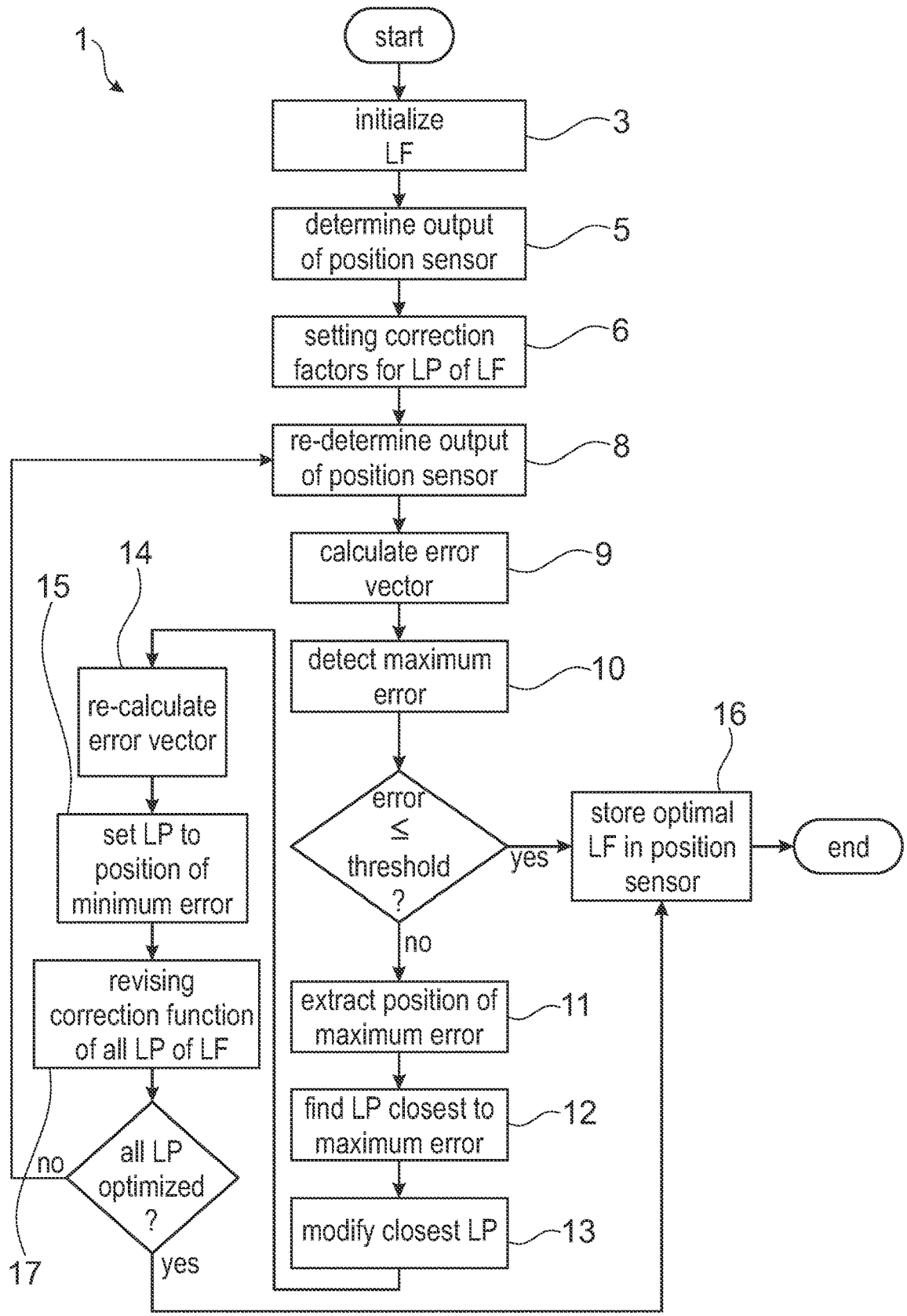
FIG. 4 a flow diagram showing a detailed third embodiment of the method.

FIG. 4 shows a flow diagram showing a detailed third embodiment of the method 1. The third embodiment shown in FIG. 4 differs from the second embodiment shown in FIG. 3 by revising 17 during each repetition the correction factors corresponding to the difference between the output of the position sensor and the ideal position of the reference signal 7 for all linearization points. The revising 17 is performed after the position of an initial linearization point has been amended, i.e., after one of the initial linearization points has been set 15 to a position corresponding to its minimum error.

What is claimed is:

1. A method for calibrating a linearization function for correcting an output of a position sensor providing a continuous output position signal,
    wherein the linearization function has a predetermined number of linearization points,
    wherein each linearization point specifies a correction factor for a corresponding position of the output signal of the position sensor, and
    wherein the method comprises:
        initializing the linearization function by setting initial positions for all available linearization points, wherein the correction factor of the each initial linearization point is zero;
        determining the output of the position sensor for a full period by applying the linearization function to the position signal of the position sensor for the full period;
        setting the correction factor for each initial linearization point by comparing the output of the position sensor with a reference signal, wherein the reference signal provides an ideal position signal for the full period of the position sensor;

re-determining the output of the position sensor for a full period by applying the linearization function to the position signal of the position sensor for the full period;

calculating an error vector for the full period of the position sensor by comparing the output of the position sensor with the reference signal;

detecting the maximum error of the error vector;

if the maximum error is above a predefined threshold, optimizing the linearization function by:

extracting the position of the maximum error from the error vector;

finding the linearization point that is closest to the maximum error of the error vector;

modifying the linearization point that is closest to the maximum error by stepwise changing the position of the linearization point within predefined boundaries and changing the corresponding correction value based on a comparison of the output of the position sensor with the reference signal;

re-calculating the error vector for each step of the modified linearization point to find a position of a minimum error for that linearization point; and setting the linearization point to the position of the minimum error; and if the maximum error is below the predefined threshold:

storing the linearization function in the position sensor.

2. The method according to claim 1, comprising applying a zero calibration to the position sensor signal setting a mechanical initial position of the position sensor signal to a position value of zero.

3. The method according to claim 2, further comprising applying a zero calibration to the reference signal setting a mechanical initial position of the reference signal to a position value of zero.

4. The method according to claim 1, wherein the reference signal is provided by an external high precision position sensor system.

5. The method according to claim 1, wherein the reference signal is generated by using an ideal input signal for calculating the position and a corresponding ideal output of the position sensor.

6. The method according to claim 1, wherein re-determining the output of the position sensor, calculating the error vector, detecting the maximum error and optimizing the linearization function are repeated until the maximum error is below the predefined threshold and/or until all initial linearization points of the linearization function have been optimized.

7. The method according to claim 6, wherein the optimizing of the linearization function is only performed once for each initial linearization point.

8. The method according to claim 6, comprising, during each repetition, revising the correction factors corresponding to a difference between the output of the position sensor and the ideal position of the reference signal for all linearization points after the position of an initial linearization point has been amended.

9. The method according to claim 1, wherein the setting of the initial positions for all available linearization points depends on the form of the expected output signal of the position sensor.

10. The method according to claim 9, wherein a distance between two adjacent initial linearization points is constant for a linearly changing output signal.

11. The method according to claim 9, wherein a number of initial linearization points is higher in areas of the output signal with a non-linearly rate of changing and lower in areas of the output signal with a constant output signal or a linearly changing output signal.

12. The method according to claim 1, wherein the step size of the stepwise changing of the position of the linearization point within predefined boundaries depends on the resolution of the position sensor, the accuracy of the position sensor, the processing and/or storage capabilities of the position sensor.

13. The method according to claim 1, wherein the boundaries of the stepwise changing of the position of the linearization point within predefined boundaries depend on a distance to the neighbouring linearization points.

14. The method according to claim 13, wherein boundaries around the position of the initial linearization point are half or less than the distance to the neighbouring linearization points.

15. A position sensor comprising a signal processing unit, wherein the signal processing unit implements the method according to claim 1.

* * * * *